United States Patent
Baek et al.

(10) Patent No.: US 12,401,459 B2
(45) Date of Patent: *Aug. 26, 2025

(54) METHOD AND APPARATUS FOR INTRA-UE PRIORITIZATION CONSIDERING UL GRANT RECEIVED IN RANDOM ACCESS RESPONSE

(71) Applicant: Samsung Electronics Co., Ltd., Suwon-si (KR)

(72) Inventors: Sangkyu Baek, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,356

(22) Filed: May 8, 2024

(65) Prior Publication Data

US 2024/0292466 A1    Aug. 29, 2024

Related U.S. Application Data

(63) Continuation of application No. 17/221,230, filed on Apr. 2, 2021, now Pat. No. 12,004,218.

(30) Foreign Application Priority Data

Apr. 6, 2020  (KR) .................. 10-2020-0041804

(51) Int. Cl.
*H04W 74/0833* (2024.01)
*H04L 1/1812* (2023.01)
(Continued)

(52) U.S. Cl.
CPC ....... *H04W 74/0833* (2013.01); *H04L 1/1812* (2013.01); *H04W 72/1268* (2013.01); *H04W 72/23* (2023.01)

(58) Field of Classification Search
CPC ......... H04W 74/0833; H04W 72/1268; H04W 72/23; H04W 72/569; H04W 72/02;
(Continued)

(56) References Cited

U.S. PATENT DOCUMENTS

| 2011/0170495 A1 | 7/2011 | Earnshaw et al. |
| 2018/0077732 A1 | 3/2018 | Yi et al. |

(Continued)

FOREIGN PATENT DOCUMENTS

WO    2019/246285 A1    12/2019

OTHER PUBLICATIONS

Asustek, "Handling UL grant prioritization with non-overlapping PUSCH duration", R2-2001598, 3GPP TSG-RAN WG2 Meeting #109e Feb. 24-Mar. 6, 2019 (Year: 2019).*

(Continued)

*Primary Examiner* — Liem H. Nguyen
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method includes identifying whether a medium access control (MAC) entity of the terminal is configured with a logical channel (LCH)-based prioritization, identifying whether a first uplink grant is associated with a random access, determining the first uplink grant to be a prioritized uplink grant, and transmitting an uplink signal based on the prioritized uplink grant.

12 Claims, 11 Drawing Sheets

(51) Int. Cl.
*H04W 72/1268* (2023.01)
*H04W 72/23* (2023.01)

(58) Field of Classification Search
CPC  H04W 74/006; H04W 72/535; H04L 1/1812; H04L 1/1822; H04L 1/1887
See application file for complete search history.

(56) References Cited

U.S. PATENT DOCUMENTS

| | | | |
|---|---|---|---|
| 2018/0098349 A1 | 4/2018 | Sun et al. | |
| 2018/0324872 A1* | 11/2018 | Babaei | H04L 5/0094 |
| 2020/0053749 A1 | 2/2020 | Liu et al. | |
| 2020/0084790 A1 | 3/2020 | Wang et al. | |
| 2020/0146054 A1* | 5/2020 | Jeon | H04W 74/0833 |
| 2020/0221468 A1 | 7/2020 | Babaei et al. | |
| 2020/0275474 A1* | 8/2020 | Chen | H04L 1/1848 |
| 2020/0314917 A1* | 10/2020 | Jeon | H04W 74/08 |
| 2021/0127402 A1* | 4/2021 | Lee | H04W 72/56 |
| 2021/0195623 A1* | 6/2021 | Xu | H04W 72/569 |
| 2021/0219310 A1 | 7/2021 | Yi et al. | |
| 2021/0258981 A1 | 8/2021 | Hosseini et al. | |
| 2021/0307027 A1* | 9/2021 | Kung | H04W 72/569 |
| 2021/0385796 A1* | 12/2021 | Shi | H04W 72/23 |
| 2021/0400684 A1 | 12/2021 | Kung et al. | |
| 2021/0400701 A1* | 12/2021 | Lu | H04W 72/21 |
| 2022/0150950 A1 | 5/2022 | Islam et al. | |
| 2022/0159668 A1 | 5/2022 | Chin et al. | |
| 2022/0201731 A1 | 6/2022 | Lee et al. | |
| 2022/0201740 A1 | 6/2022 | Miao | |
| 2022/0295576 A1* | 9/2022 | Cirik | H04W 74/02 |
| 2022/0338211 A1* | 10/2022 | Alabbasi | H04W 72/569 |
| 2023/0024069 A1 | 1/2023 | Zou et al. | |

OTHER PUBLICATIONS

Samsung, "Summary of Data-Data Prioritization and SR-Data Prioritization", R2-2002083, 3GPP TSG-RAN2 Meeting #109-e Feb. 24-Mar. 6, 2020 (Year: 2020).*

Asustek; Additional prioritization for configured uplink grant; 3GPP TSG-RAN WG2 Meeting #109 electronic; R2-2001597; Feb. 24-Mar. 6, 2020.

Samsung; Introduction of NR IIOT; 3GPP TSG-RAN2 Meeting #109-e; R2-2002341; Feb. 24-Mar. 6, 2020.

Asustek; UL grant overridden between configured grant and RAR grant; 3GPP TSG RAN WG1 #99; R1-1912862; Nov. 18-22, 2019; Reno, USA.

PCT International Search Report; International Application No. PCT/KR2021/004230; Jul. 13, 2021.

3GPP TS 38.321 V15.8.0, 3rd Generation Partnership Project; Technical Specification Group Radio Access Network; NR; Medium Access Control (MAC) protocol specification, (Release 15), Jan. 7, 2020.

Extended European Search Report dated Aug. 2, 2023, issued in European Patent Application No. 21785118.7.

Korean Office Action dated Jun. 12, 2025, issued in Korean Patent Application No. 10-2020-0041804.

* cited by examiner

METHOD AND APPARATUS FOR INTRA-UE PRIORITIZATION CONSIDERING UL GRANT RECEIVED IN RANDOM ACCESS RESPONSE

CROSS-REFERENCE TO RELATED APPLICATION(S)

This application is a continuation application of prior application Ser. No. 17/221,230, filed on Apr. 2, 2021, which is based on and claims priority under 35 U.S.C. § 119(a) of a Korean patent application number 10-2020-0041804, filed on Apr. 6, 2020, in the Korean Intellectual Property Office, the disclosure of which is incorporated by reference herein in its entirety.

BACKGROUND

1. Field

The disclosure relates to a method and apparatus for transmitting data efficiently in case that uplink grants overlap on the time axis in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only, and to assist with an understanding of the disclosure. No determination has been made, and no assertion is made, as to whether any of the above might be applicable as prior art with regard to the disclosure.

SUMMARY

When uplink grants overlap on the time axis in an entity for which logical channel-based prioritization is configured based on priority, the terminal needs to check whether a MAC PDU is stored in the buffer and determine the radio resource to be selected for transmission accordingly.

Aspects of the disclosure are to address at least the above-mentioned problems and/or disadvantages, and to provide at least the advantages described below. Accordingly, an aspect of the disclosure is to provide a method and apparatus for transmitting data efficiently in case that uplink grants overlap on the time axis in a mobile communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes identifying whether a medium access control (MAC) entity of the terminal is configured with a logical channel (LCH)-based prioritization, identifying whether a first uplink grant is associated with a random access in case that the MAC entity is configured with the LCH-based prioritization, determining to consider the first uplink grant as a prioritized uplink grant in case that the first uplink grant is associated with the random access, and transmitting an uplink signal based on the prioritized uplink grant.

In accordance with another aspect of the disclosure, a terminal in a wireless communication system is provided. The terminal includes a transceiver, and at least one processor coupled with the transceiver and configured to identify whether a medium access control (MAC) entity of the terminal is configured with a logical channel (LCH)-based prioritization, identify whether a first uplink grant is associated with a random access in case that the MAC entity is configured with the LCH-based prioritization, determine to consider the first uplink grant as a prioritized uplink grant in case that the first uplink grant is associated with the random access, and transmit, via the transceiver, an uplink signal based on the prioritized uplink grant.

According to an embodiment of the disclosure, it is possible to perform communication more efficiently when a problem that uplink resources overlap on the time axis occurs in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
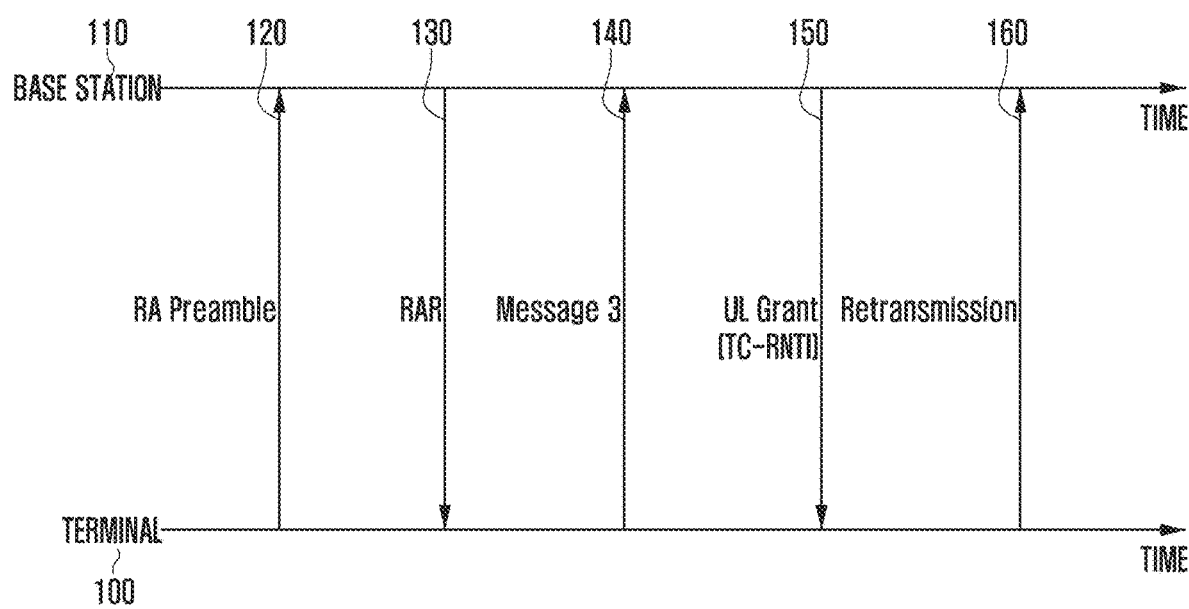
FIG. 1 illustrates operations of a terminal that performs random access to a base station according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, and the embodiments are provided only to complete the disclosure and to fully inform the scope of the disclosure to those skilled in the art to which the disclosure pertains. The disclosure is defined only by the scope of the claims. The same reference symbols are used throughout the description to refer to the same parts.

It will be appreciated that blocks of a flowchart and a combination of flowcharts may be executed by computer program instructions. These computer program instructions may be loaded on a processor of a general-purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a non-transitory computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit," "module," or the like used in the embodiments, may refer to a software component or a hardware component such as a field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

In the following description of the disclosure, descriptions of functions and structures well known in the art may be omitted without obscuring the subject matter of the disclosure. Hereinafter, embodiments of the disclosure will be described with reference to the accompanying drawings.

FIG. 1 illustrates operations of a terminal that performs random access to a base station according to an embodiment of the disclosure.

Referring to FIG. 1, a base station 110 may instruct a terminal 100 to perform random access (RA) when the terminal (or user equipment (UE)) performs initial attachment, or according to uplink synchronization or the need of the base station. When the terminal 100 needs to perform random access to the base station 110, the terminal 100 may transmit a random access preamble (RA preamble) to the base station 110 at operation 120.

Here, the random access preamble transmitted by the terminal 100 to the base station 110 may be a random access preamble set in advance by the base station 110, and random access using such a preset random access preamble is referred to as contention-free random access (CFRA). Otherwise, terminals performing random access may share random access preambles, and a terminal may use one random access preamble available to the terminal. This random access is referred to as contention-based random access (CBRA). The base station can configure the type of random access to be used by a terminal, and if there is no random access preamble available to a terminal, the terminal may use contention-based random access.

When receiving the random access preamble transmitted by the terminal 100, the base station 110 may calculate the time when the random access preamble has arrived and adjust the timing advance (TA) value indicating the time when the terminal 100 starts uplink transmission. In addition, the base station 110 may allocate an uplink grant so that the terminal 100 having transmitted the random access preamble may start data transmission. For the above-described purpose, the message transmitted by the base station to the terminal in reply to the random access preamble is called a random access response (RAR) at operation 130.

The RAR message may include a timing advance value to be adjusted by the terminal, allocation information of an uplink grant that can be used by the terminal receiving the RAR to transmit data, and a temporary cell-radio network temporary identifier (temporary C-RNTI, TC-RNTI) to be used during the random access process. The uplink grant indicated by the radio resource allocation information included in the RAR message, as a resource that can be used by the terminal receiving the RAR to transmit data, is referred to as "uplink grant received in RAR."

In this case, when a message 3 generated for the purpose of a connection request or the like is to be transmitted in the random access process, a MAC protocol data unit (PDU) present in the message 3 buffer may be included in the uplink grant received in RAR and transmitted at operation 140. However, when the uplink grant received in RAR is allocated, but there is no MAC PDU in the message 3 buffer, the terminal may generate a MAC PDU by applying a logical channel prioritization (LCP) procedure to data of another logical channel (LCH) or a medium access control-control element (MAC CE). The terminal may transmit the generated MAC PDU through the uplink grant received in RAR. If a MAC PDU present in the message 3 buffer is to be transmitted via the uplink grant received in RAR, the MAC PDU to be transmitted may be regarded as related to the random access process and regarded as more important information than regular data.

The base station may request retransmission due to a problem such as failure of uplink transmission using the uplink grant received in RAR. In this case, the base station may allocate a retransmission resource to the terminal by using a temporary C-RNTI included in the RAR 130 at operation 150. The retransmission resource may be allocated by the base station to the terminal by using a downlink control information (DCI) format on the physical downlink control channel (PDCCH). Thereafter, the terminal may perform retransmission by using the allocated retransmission resource at operation 160. In this way, even when data is transmitted using a temporary C-RNTI, as it may be required to transmit a MAC PDU present in the message 3 buffer, this uplink grant may be regarded as more important information than regular data.

In one embodiment, because the uplink grant at operation 160 allocated using a temporary C-RNTI is a retransmission resource of the uplink grant received in RAR, detailed operations may be described by treating the uplink grant allocated using a temporary C-RNTI as an uplink grant received in RAR.

Figure 2:
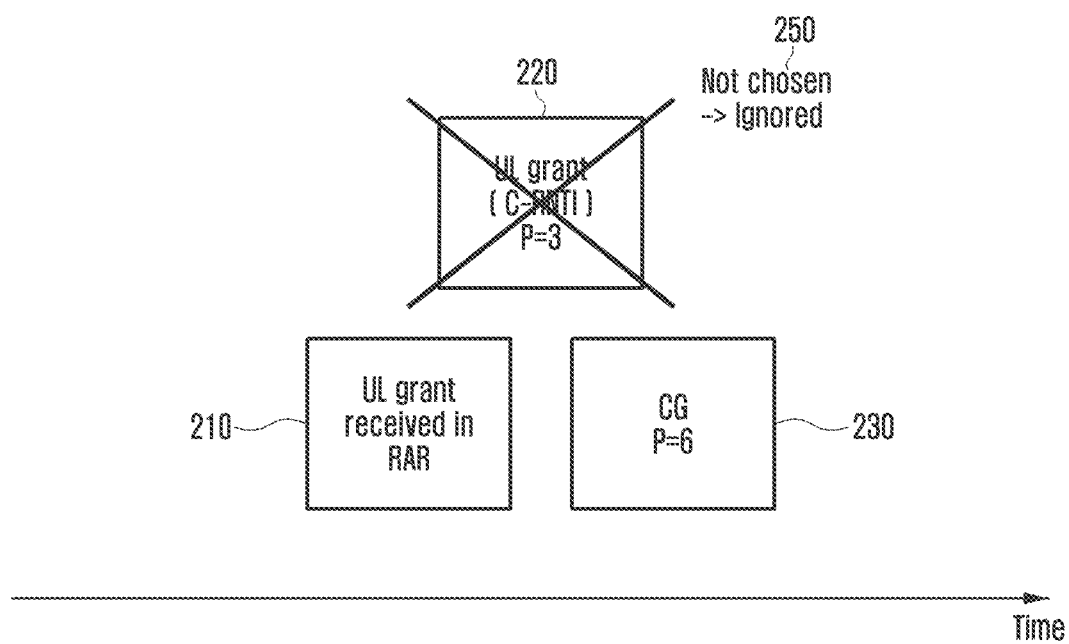
FIG. 2 illustrates a scenario in which an uplink grant received in RAR overlaps with a dynamic grant according to an embodiment of the disclosure.

FIG. 2 illustrates a scenario in which an uplink grant received in RAR overlaps with a dynamic grant according to an embodiment of the disclosure.

Referring to FIG. 2, because the random access operation is triggered by a terminal or because multiple terminals share a random access preamble in contention-based random access, it is difficult for the base station to identify the terminal having transmitted a random access preamble. Hence, the base station may allocate another uplink grant to the terminal, and the uplink grant allocated by the base station may overlap with the uplink grant received in RAR on the time axis or the time and frequency axes. FIG. 2 shows an embodiment in which an uplink grant received in RAR 210 and a dynamic grant allocated with C-RNTI 220 overlap on a time axis.

In one embodiment, when a terminal needs to transmit only one uplink grant at the same time point in a single cell, the terminal may select one uplink grant randomly or according to a preset rule and perform transmission. The embodiment of FIG. 2 shows that the terminal performs transmission by selecting the uplink grant received in RAR 210. Here, the uplink grant received in RAR may also include an uplink grant allocated with a temporary C-RNTI.

In this case, the terminal cannot use the uplink grant allocated with C-RNTI 220 overlapping with the uplink grant received in RAR 210 on the time axis. However, if there is another uplink grant 230 overlapping with the uplink grant allocated with C-RNTI 220, the overlapping uplink grant 230 may be not prioritized (deprioritized) due to the uplink grant 220 that has become unusable, which may result in an uplink grant resource that cannot perform transmission. For example, if there is another uplink grant 230 that overlaps on the time axis or on the time and frequency axes with the uplink grant allocated with C-RNTI 220 that has become unusable, as the other uplink grant 230 is deprioritized due to the uplink grant allocated with C-RNTI 220 that has become unusable, a situation in which the terminal cannot perform uplink transmission through the other uplink grant 230 may occur.

Uplink grants allocated with C-RNTI, configured scheduling-radio network temporary identifier (CS-RNTI), or modulation and coding scheme-cell-radio network temporary identifier (MCS-C-RNTI) and configured grant (CG) resources, may overlap with each other in the time domain. When the uplink grants overlap, an uplink grant with a higher priority may be used. The priority value of an uplink grant may be determined to be the highest priority value of data included in a MAC PDU that is included or can be included in the uplink grant.

In the embodiment of FIG. 2, as an example, it is assumed that the priority of the uplink grant allocated with C-RNTI 220 has a value of 3 and the priority of the configured grant 230 overlapping therewith on the time axis has a value of 6. As a smaller value means a higher priority, the uplink grant allocated with C-RNTI has a higher priority. However, this uplink grant 220 is not used because the uplink grant received in RAR 210 is transmitted. Therefore, the situation in which the configured grant 230 is deprioritized due to the uplink grant 220 and cannot be used for transmission may result in waste of radio resources.

To prevent this, if there is an uplink grant that is not used because it overlaps on the time axis with the uplink grant received in RAR having been transmitted, such a resource may be ignored and considered as if the resource has not been allocated at operation 250. Specifically, in the process of prioritization with other resources, such a resource may be excluded from the priority comparison with other resources overlapping on the time axis. For example, the uplink grant that is not used because it overlaps on the time axis with the uplink grant received in RAR having been transmitted may be excluded from objects of priority comparison in the process of prioritization with other resources. Then, it can be considered as if there is no uplink grant overlapping on the time axis with the configured grant having a priority value of 6, and the configured grant can be transmitted if there is no other uplink grant that overlaps on the time axis with the configured grant and has a higher priority than the configured grant.

Figure 3:
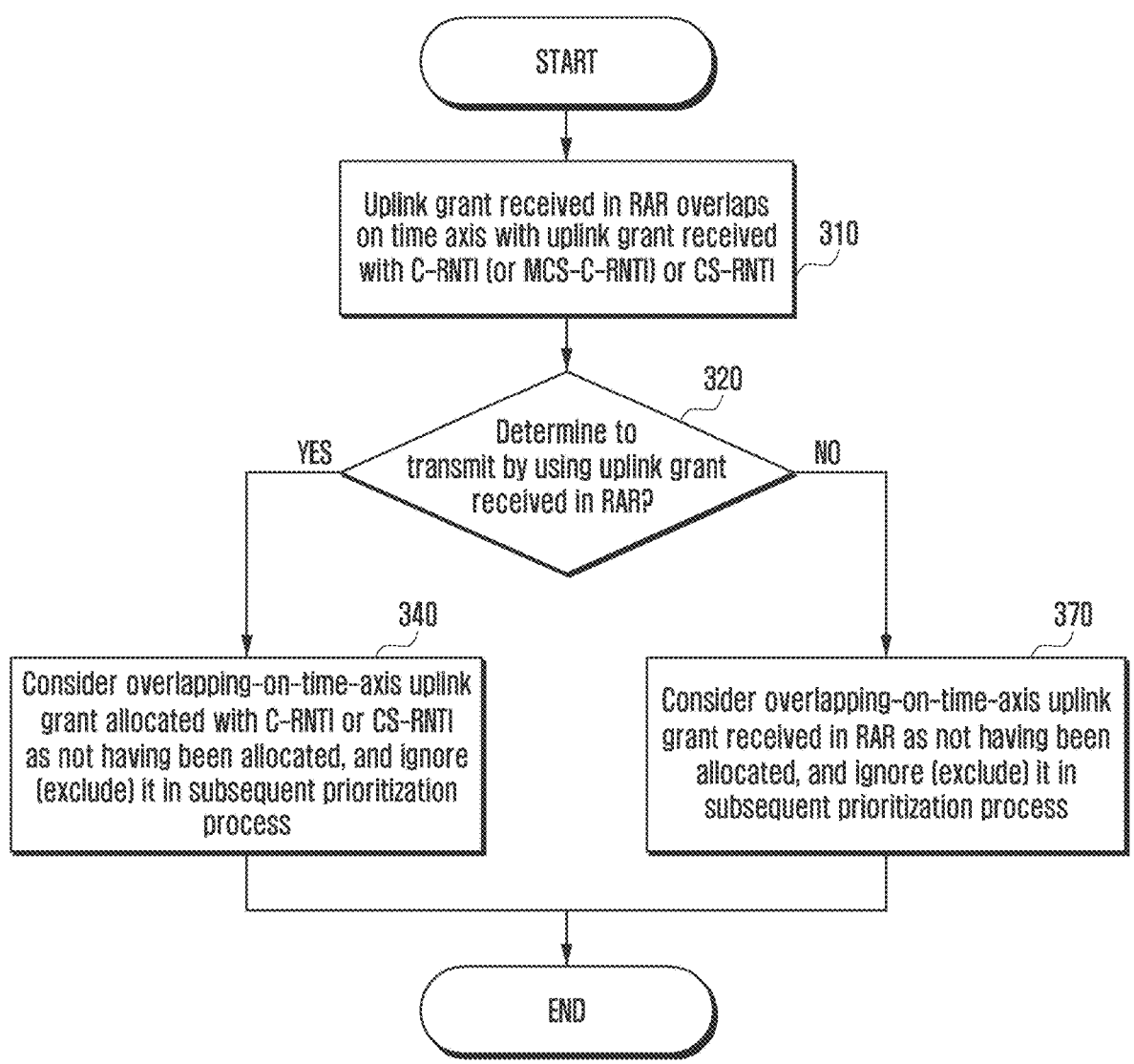
FIG. 3 is a flowchart illustrating operations of a terminal when an uplink grant received in RAR is selected according to an embodiment of the disclosure.

FIG. 3 is a flowchart illustrating operations of a terminal when an uplink grant received in RAR is selected according to an embodiment of the disclosure.

As shown in FIG. 2, a certain uplink grant may overlap with the uplink grant received in RAR on the time axis or the time and frequency axes. Referring to FIG. 3, the uplink grant received in RAR may overlap on the time axis with an uplink grant received with C-RNTI (or MCS-C-RNTI) or CS-RNTI at operation 310. For example, the terminal may identify that the uplink grant received in RAR overlaps on the time axis with an uplink grant received with C-RNTI (or MCS-C-RNTI) or CS-RNTI. Here, the uplink grant received with CS-RNTI may be considered as a retransmission resource for the configured grant whose new data indicator (NDI) value of the downlink control information (DCI) is 1.

If the terminal determines at operation 320 to perform uplink transmission by using the uplink grant received in RAR according to preset conditions or other implementation options, the terminal may ignore the uplink grant allocated with C-RNTI (or MCS-C-RNTI) or CS-RNTI in the subsequent uplink scheduling, multiplexing, or prioritization process. In one embodiment, the terminal may consider at operation 340 that the uplink grant received with C-RNTI (or MCS-C-RNTI) or CS-RNTI and overlapping with the uplink grant received in RAR has not been allocated, and hence in the subsequent prioritization process, the terminal may have a result of preventing the uplink grant received with C-RNTI (or MCS-C-RNTI) or CS-RNTI and overlapping with the uplink grant received in RAR from becoming a prioritized uplink grant.

In one embodiment, the uplink grant allocated with C-RNTI (or MCS-C-RNTI) or CS-RNTI and overlapping with the uplink grant received in RAR may be excluded from the subsequent uplink scheduling, multiplexing, or prioritization process. According to an embodiment, upon determining to perform transmission using the uplink grant received in RAR, the terminal may regard the uplink grant allocated with C-RNTI (or MCS-C-RNTI) or CS-RNTI and overlapping with the uplink grant received in RAR as a deprioritized uplink grant.

As another embodiment, if the terminal determines at operation 320 not to perform uplink transmission by using the uplink grant received in RAR, the terminal may determine to perform transmission by using the uplink grant allocated with C-RNTI (or MCS-C-RNTI) or CS-RNTI. In this case, the terminal may consider at operation 370 that the uplink grant received in RAR and overlapping on the time axis with the uplink grant allocated with C-RNTI (or MCS-C-RNTI) or CS-RNTI has not been allocated and may ignore it in the subsequent uplink scheduling, multiplexing, or prioritization process. According to an embodiment, the terminal may consider that the uplink grant received in RAR has not been allocated, and hence in the subsequent prioritization process, the terminal may have a result of preventing the uplink grant received in RAR and overlapping on the time axis with the uplink grant allocated with C-RNTI (or MCS-C-RNTI) or CS-RNTI from becoming a prioritized uplink grant.

In one embodiment, the uplink grant received in RAR and overlapping on the time axis with the uplink grant allocated with C-RNTI (or MCS-C-RNTI) or CS-RNTI may be excluded from the subsequent uplink scheduling, multiplexing, or prioritization process. According to an embodiment, the terminal may regard the uplink grant received in RAR and overlapping on the time axis with the uplink grant allocated with C-RNTI (or MCS-C-RNTI) or CS-RNTI as a deprioritized uplink grant.

Figure 4:
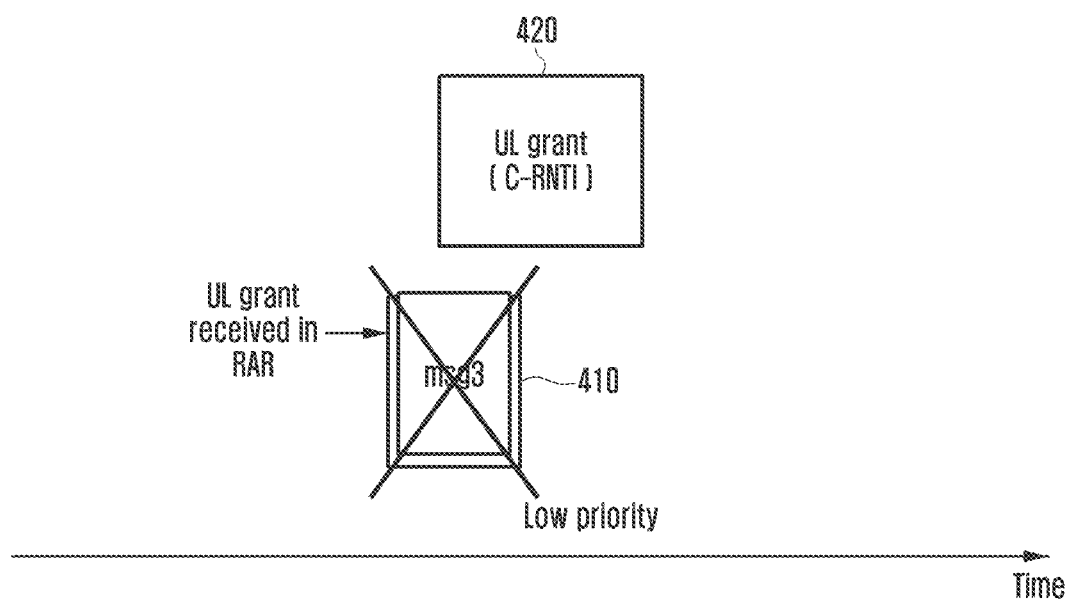
FIG. 4 illustrates a problem that may occur when an uplink grant received in RAR is not used according to an embodiment of the disclosure.

FIG. 4 illustrates a problem that may occur when an uplink grant received in RAR is not used according to an embodiment of the disclosure.

Referring to FIG. 4, because the random access operation is triggered by a terminal or because multiple terminals share a random access preamble in contention-based random access, it is difficult for the base station to identify the terminal having transmitted a random access preamble. Hence, the base station may allocate another uplink grant to the terminal, and the uplink grant allocated by the base station may overlap with the uplink grant received in RAR on the time axis or the time and frequency axes. FIG. 4 shows an embodiment in which the uplink grant received in RAR 410 and the dynamic grant allocated with C-RNTI 420 overlap on a time axis. Here, the uplink grant received in RAR may also include an uplink grant allocated with a temporary C-RNTI.

In one embodiment, when a terminal needs to transmit only one uplink grant at the same time point in a single cell, the terminal may select one uplink grant randomly or according to a preset rule and perform transmission. The embodiment of FIG. 4 shows that the terminal performs transmission by selecting the uplink grant allocated with C-RNTI 420.

In this case, the terminal cannot use the uplink grant received in RAR 410. When a message 3 generated for the purpose of a connection request or the like is to be transmitted in the random access process, a MAC PDU present in the message 3 buffer may be included in the uplink grant received in RAR and transmitted. However, when the uplink grant received in RAR is allocated, but there is no MAC PDU in the message 3 buffer, the terminal may generate a MAC PDU by applying a logical channel prioritization procedure to data of another logical channel or a MAC CE. The terminal may transmit the generated MAC PDU through the uplink grant received in RAR. If a MAC PDU present in the message 3 buffer is to be transmitted via the uplink grant received in RAR, the MAC PDU present in the message 3 buffer may be regarded as related to the random access process and regarded as more important information than regular data. Likewise, when data is transmitted using a temporary C-RNTI, as it may be required to transmit a MAC PDU present in the message 3 buffer, this uplink grant may be regarded as more important information than regular data.

However, as described above, when the terminal selects the uplink grant allocated with C-RNTI (or MCS-C-RNTI) or CS-RNTI without selecting the uplink grant received in RAR, the MAC PDU in the message 3 buffer may be not transmitted. If the MAC PDU in the message 3 buffer cannot be transmitted, this may cause a delay in the random access operation, and thus the quality of wireless communication may be degraded. Accordingly, a method of transmitting the MAC PDU present in the message 3 buffer without delay may be required. To this end, when determining the priority of the uplink grant, the terminal may assign a higher priority to the message 3 compared to data of other logical channels. In this case, when the uplink grant received in RAR overlaps with other uplink grants on the time axis or the time and frequency axes, the uplink grant received in RAR may become a prioritized uplink grant due to the message 3. Uplink transmission may be actually performed by using the resource corresponding to the prioritized uplink grant.

Figure 5:
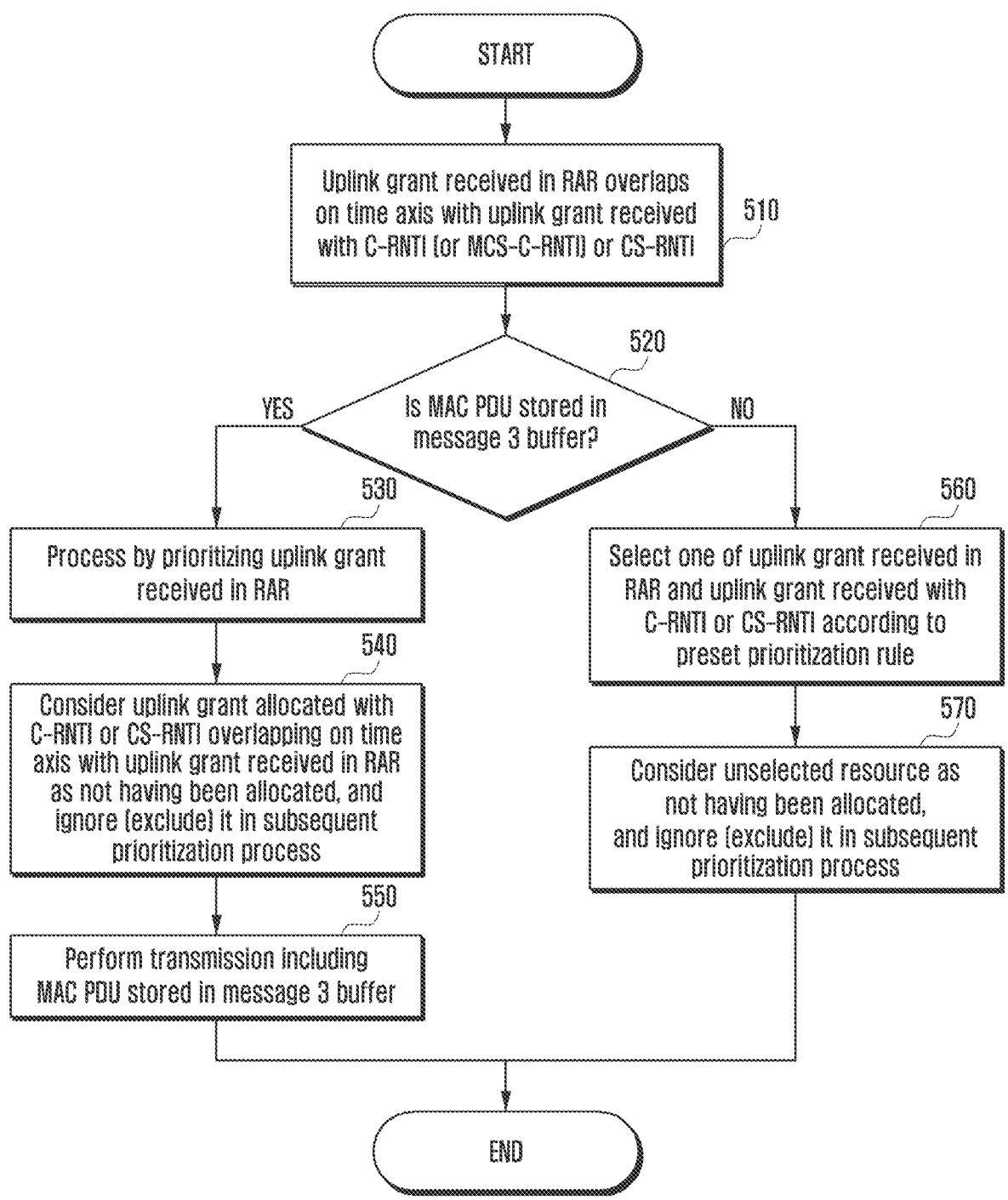
FIG. 5 is a flowchart illustrating a method for a terminal to transmit a MAC PDU present in a message 3 buffer according to an embodiment of the disclosure.

FIG. 5 is a flowchart illustrating a method for a terminal to transmit a MAC PDU present in a message 3 buffer according to an embodiment of the disclosure.

Referring to FIG. 5, if the MAC PDU in the message 3 buffer needs to be transmitted through the uplink grant received in RAR, the uplink grant received in RAR needs to be transmitted. In the embodiment of FIG. 5, it is assumed that in a MAC entity in which logical channel-based prioritization is configured based on the highest priority of a logical channel included or to be included in an uplink grant, the uplink grant received in RAR overlaps on the time axis with the uplink grant received with C-RNTI (or MCS-C-RNTI) or CS-RNTI at operation 510. For example, the terminal may identify that the uplink grant received in RAR overlaps on the time axis with the uplink grant received with C-RNTI (or MCS-C-RNTI) or CS-RNTI. In this case, the terminal needs to check whether a MAC PDU is stored in the message 3 buffer and determine the radio resource to be selected for transmission correspondingly at operation 520.

If a MAC PDU is stored in the message 3 buffer, to transmit the MAC PDU in the message 3 buffer, the terminal may select the uplink grant received in RAR to perform transmission. In one embodiment, the terminal may perform transmission of the uplink grant received in RAR by considering the uplink grant received in RAR as a prioritized uplink grant at operation 530. This is because if the operation 530 is not performed, data to which the message 3 belongs is given a lower priority than other uplink grants overlapping on the time axis in the prioritization process and may be not transmitted.

Then, the uplink grant received with C-RNTI (or MCS-C-RNTI) or CS-RNTI and overlapping with the uplink grant received in RAR may be ignored in the subsequent uplink scheduling, multiplexing, or prioritization process. In one embodiment, the terminal may consider at operation 540 that the uplink grant received with C-RNTI (or MCS-C-RNTI) or CS-RNTI and overlapping on the time axis with the uplink grant received in RAR has not been allocated, and hence in the subsequent prioritization process, the terminal may have a result of preventing the uplink grant received with C-RNTI (or MCS-C-RNTI) or CS-RNTI and overlapping on the time axis with the uplink grant received in RAR from becoming a prioritized uplink grant.

In one embodiment, the uplink grant received with C-RNTI (or MCS-C-RNTI) or CS-RNTI may be ignored in the subsequent uplink scheduling, multiplexing, or prioritization process. In one embodiment, upon determining to perform transmission using the uplink grant received in RAR, the terminal may regard the uplink grant allocated with C-RNTI (or MCS-C-RNTI) or CS-RNTI and overlapping on the time axis with the uplink grant received in RAR as a deprioritized uplink grant. In addition, the terminal may transmit at operation 550 the uplink grant received in RAR including the MAC PDU stored in the message 3 buffer. Here, if the size of the uplink grant does not match the size of the MAC PDU in the message 3 buffer (the size of the MAC PDU is somewhat larger), the terminal may exclude the MAC CE or the like among the MAC PDU stored in the message 3 buffer and include the remaining portion of the MAC PDU matching the size of the uplink grant.

If no MAC PDU is stored in the message 3 buffer at operation 520, the message 3 may not have to be transmitted first. Hence, the MAC entity of the terminal may perform transmission by selecting at operation 560 one of the uplink grant received in RAR and the uplink grant received with C-RNTI (or MCS-C-RNTI) or CS-RNTI according to a preset prioritization rule. In addition, the unselected uplink grant overlapping on the time axis may be considered to be unallocated and may be ignored in the uplink scheduling, multiplexing, or prioritization process.

According to an embodiment, the terminal may consider at operation 570 that the unselected uplink grant has not been allocated, and hence in the subsequent prioritization process, the terminal may have a result of preventing the unselected uplink grant from becoming a prioritized uplink grant. In one embodiment, the unselected uplink grant may be excluded from the subsequent uplink scheduling, multiplexing, or prioritization process. According to an embodiment, the terminal may regard the unselected uplink grant as a deprioritized uplink grant.

Figure 6:
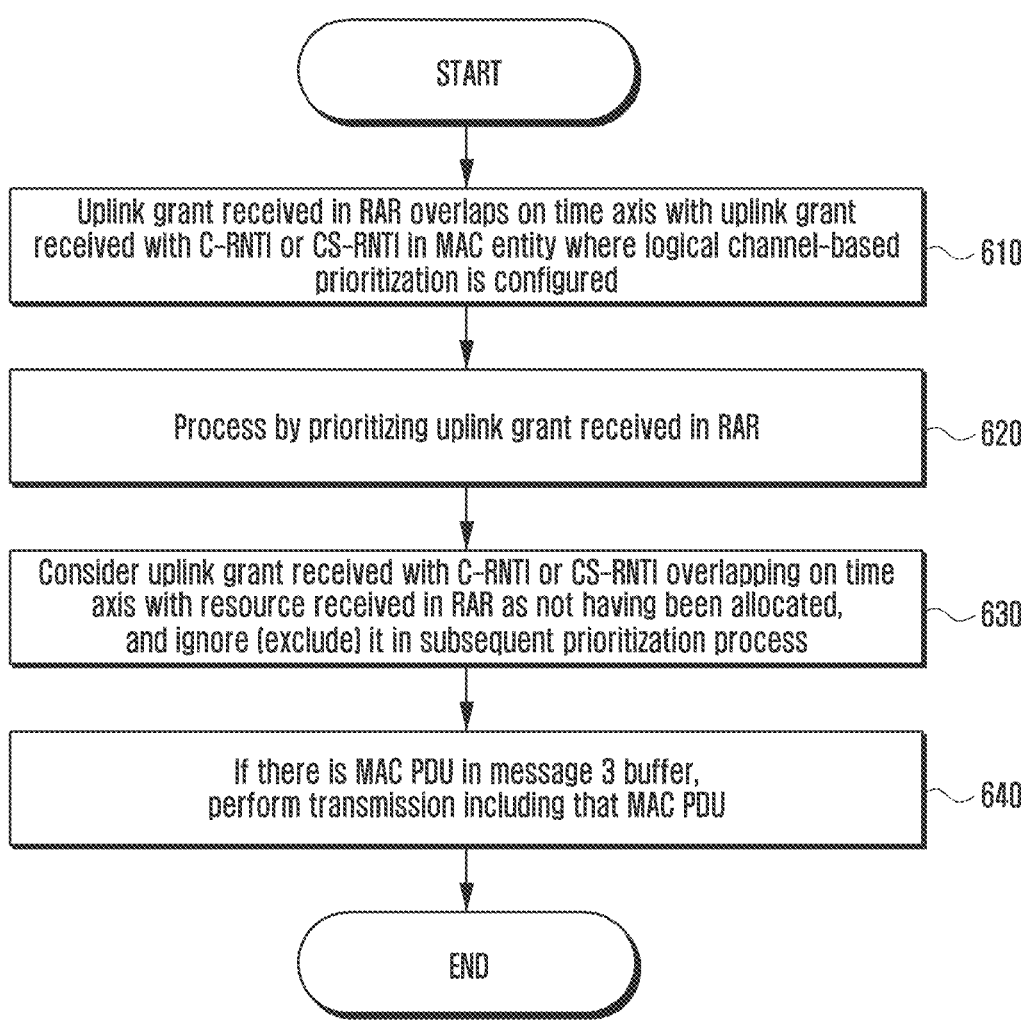
FIG. 6 is a flowchart illustrating a method for a terminal to transmit a MAC PDU present in a message 3 buffer according to an embodiment of the disclosure.

FIG. 6 is a flowchart illustrating a method for a terminal to transmit a MAC PDU present in a message 3 buffer according to an embodiment of the disclosure.

Referring to FIG. 6, if the MAC PDU in the message 3 buffer needs to be transmitted via the uplink grant received in RAR, the uplink grant received in RAR needs to be transmitted. In the embodiment of FIG. 6, it is assumed that in a MAC entity in which logical channel-based prioritization is configured based on the highest priority of a logical channel included or to be included in an uplink grant, the uplink grant received in RAR overlaps on the time axis with the uplink grant received with C-RNTI (or MCS-C-RNTI) or CS-RNTI at operation 610.

In this case, the MAC entity of the terminal may perform at operation 620 processing by prioritizing the uplink grant received in RAR. As a MAC PDU may be stored in the message 3 buffer, there is an effect that the transmission priority is given to the uplink grant received in RAR. In one embodiment, the terminal may perform transmission of the uplink grant received in RAR by considering the uplink grant received in RAR as a prioritized uplink grant. It is proposed to prioritize and process the uplink grant received in RAR at operation 620, but in an embodiment, only the uplink grant allocated with a temporary C-RNTI may be prioritized and processed.

Then, the uplink grant received with C-RNTI (or MCS-C-RNTI) or CS-RNTI and overlapping on the time axis with the uplink grant received in RAR may be ignored in the subsequent uplink scheduling, multiplexing, or prioritization process. In one embodiment, the terminal may consider at operation 630 that the uplink grant received with C-RNTI (or MCS-C-RNTI) or CS-RNTI and overlapping on the time axis with the uplink grant received in RAR has not been allocated, and hence in the subsequent prioritization process, the terminal may have a result of preventing the uplink grant received with C-RNTI (or MCS-C-RNTI) or CS-RNTI and overlapping on the time axis with the uplink grant received in RAR from becoming a prioritized uplink grant. In one embodiment, the uplink grant allocated with C-RNTI (or MCS-C-RNTI) or CS-RNTI may be ignored in the subsequent uplink scheduling, multiplexing, or prioritization process. In one embodiment, upon determining to perform transmission using the uplink grant received in RAR, the terminal may regard the uplink grant allocated with C-RNTI (or MCS-C-RNTI) or CS-RNTI and overlapping on the time axis with the uplink grant received in RAR as a deprioritized uplink grant.

In addition, if there is a MAC PDU in the message 3 buffer, the terminal may include the MAC PDU stored in the message 3 buffer in the uplink grant received in RAR and perform transmission at operation 640. Here, if the size of the uplink grant does not match the size of the MAC PDU in the message 3 buffer (the size of the MAC PDU is somewhat larger), the terminal may exclude the MAC CE or the like among the MAC PDU stored in the message 3 buffer and include the remaining portion of the MAC PDU matching the size of the uplink grant. Otherwise, if there is no MAC PDU in the message 3 buffer, the terminal may obtain a MAC PDU from the multiplexing and assembly entity and perform transmission.

Figure 7:
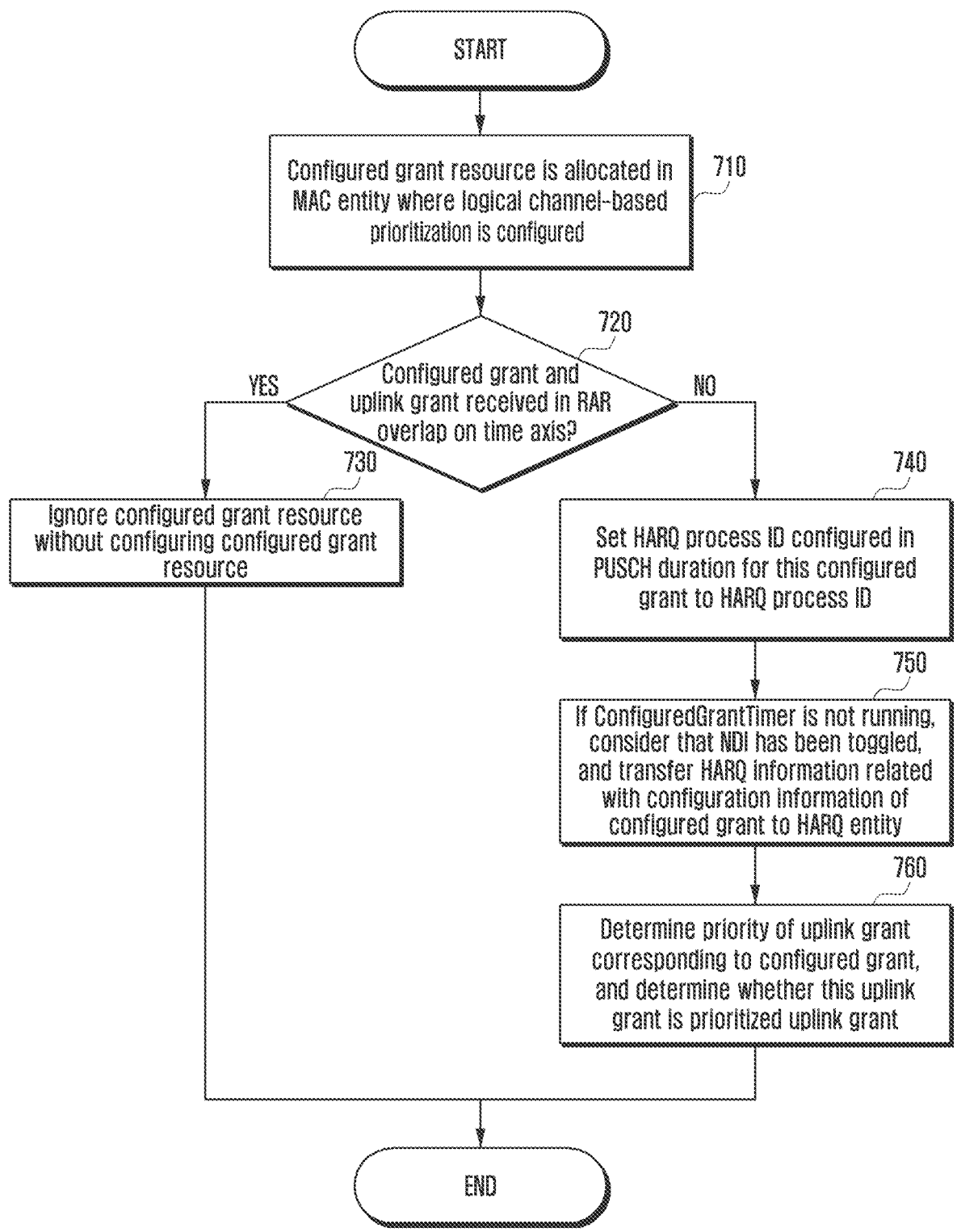
FIG. 7 is a flowchart illustrating a method for a terminal to handle a configured grant resource that overlaps with an uplink grant received in RAR on a time axis according to an embodiment of the disclosure.

FIG. 7 is a flowchart illustrating a method for a terminal to handle a configured grant resource that overlaps on a time axis with an uplink grant received in RAR according to an embodiment of the disclosure.

Referring to FIG. 7, because the configured grant resource transmitted in the uplink may be a preconfigured periodic resource, if the configured grant resource overlaps on the time axis with the uplink grant received in RAR in the MAC entity in which logical channel-based prioritization is configured, the terminal may have to use the uplink grant received in RAR that is recently configured. Although the embodiment of FIG. 4 shows that the uplink grant received in RAR overlaps on the time axis with a dynamic grant, the configured grant other than a dynamic grant may also overlap on the time axis with an uplink grant received in RAR.

In the embodiment of FIG. 7, a configured grant resource may be allocated in the MAC entity in which logical channel-based prioritization is configured based on the highest priority of a logical channel included in or to be included in the uplink grant at operation 710. The terminal may check at operation 720 whether the configured grant and the uplink grant received in RAR overlap on the time axis. If the configured grant and the uplink grant received in RAR overlap on the time axis, the terminal may ignore at operation 730 the configured grant resource without configuring the configured grant resource. For example, the terminal may perform transmission with a recognition that there is no configured grant resource. In addition, for example, the terminal may not consider this configured grant resource in other prioritization operations. Accordingly, even if this configured grant resource overlaps on the time axis with another uplink grant or scheduling request (SR) transmission, it is possible to prevent the occurrence of a problem that the transmission of another uplink grant or scheduling request is deprioritized due to this configured grant. The uplink grant received in RAR at operation 720 may include an uplink grant allocated with a temporary C-RNTI.

If the configured grant and the uplink grant received in RAR do not overlap on the time axis at operation 720, this may mean that the configured grant is usable. Hence, the HARQ (hybrid automatic repeat request) process ID set in the PUSCH (physical uplink shared channel) for this configured grant can be set at operation 740 to the HARQ process ID of the configured grant resource. For example, the terminal may set the HARQ process ID for this configured grant to HARQ process ID #2.

In addition, if ConfiguredGrantTimer is not running, the terminal may consider at operation 750 that the new data indicator (NDI) has been toggled and may prepare for configured grant transmission by transferring information related to the configuration information of the configured grant from the MAC entity to the HARQ entity.

Thereafter, the terminal may determine at operation 760 the priority of the uplink grant corresponding to the configured grant, and may determine whether this uplink grant is a prioritized uplink grant or a deprioritized uplink grant. A prioritized uplink grant may mean that it can be actually transmitted, but a deprioritized uplink grant may mean that it will be not transmitted.

Figure 8:
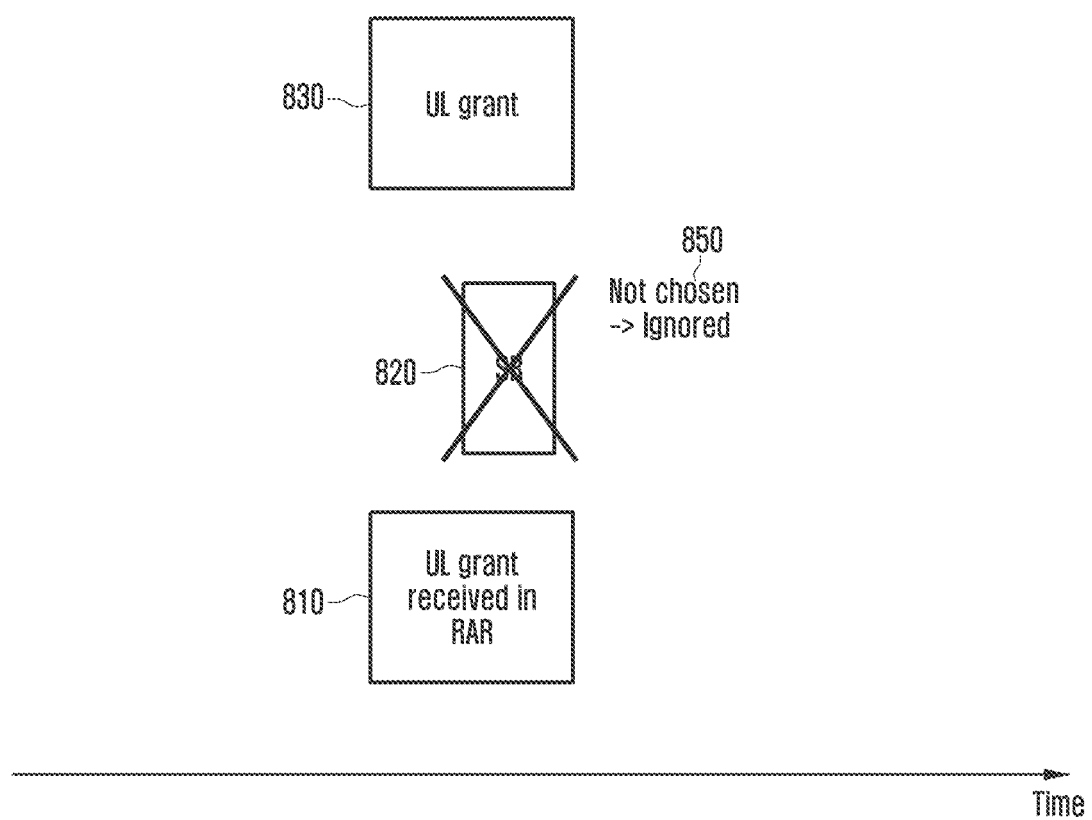
FIG. 8 illustrates a scenario in which an uplink grant received in RAR overlaps with SR transmission according to an embodiment of the disclosure.

FIG. 8 illustrates a scenario in which an uplink grant received in RAR overlaps with SR transmission according to an embodiment of the disclosure.

Referring to FIG. 8, because the random access operation is triggered by a terminal or because multiple terminals share a random access preamble in contention-based random access, it is difficult for the base station to identify the terminal having transmitted a random access preamble. Hence, the base station may allocate a PUCCH (physical uplink control channel) resource for transmitting a scheduling request (SR) message to the terminal, and the PUCCH resource through which the terminal intends to perform SR transmission may overlap on the time axis with the uplink grant received in RAR.

The embodiment of FIG. 8 shows that the uplink grant received in RAR 810 and the SR transmission 820 overlap on a time axis. As the PUCCH transmission including the SR and the PUSCH transmission corresponding to the uplink grant received in RAR cannot occur simultaneously at the same time in the MAC entity, the RAR resource through which a message 3 can be transmitted needs to be transmitted first.

The embodiment of FIG. 8 shows that the terminal selects the uplink grant received in RAR 810 to perform transmission. Here, the uplink grant received in RAR may also include an uplink grant allocated with a temporary C-RNTI. In this case, the terminal cannot perform SR transmission 820 that overlaps on the time axis with the uplink grant received in RAR. However, if there is another uplink grant overlapping on the time axis with the SR transmission inside the MAC entity, this overlapping uplink grant may be deprioritized due to the uplink grant of the SR transmission that has become unusable, generating an uplink grant resource through which transmission cannot be performed.

The SR transmission resource may overlap in the time domain with an uplink grant allocated with C-RNTI, configured scheduling-radio network temporary identifier (CS-RNTI), or modulation and coding scheme-cell-radio network temporary identifier (MCS-C-RNTI) or a configured grant (CG) resource within the cell group configured in the MAC entity, and the terminal may compare the priority of the logical channel having triggered the SR with the priority of other uplink grants, where one with a higher priority among SR transmission and other uplink grants may be actually used for transmission. The priority value of an uplink grant may be determined to be the highest priority value of data included in a MAC PDU that is included or may be included in the uplink grant.

In the embodiment of FIG. 8, the SR transmission 820 overlaps on the time axis with the uplink grant received in RAR 810, in which case the uplink grant received in RAR may be transmitted. When the uplink grant received in RAR is transmitted, this SR transmission 820 may cause another uplink grant 830 overlapping on the time axis not to be prioritized and not to be used for transmission. The occurrence of a situation in which another uplink grant is deprioritized and cannot be used for transmission due to the SR transmission 820 that is not performed in such a way may result in waste of radio resources. To prevent this, if there is SR transmission that is not performed because it overlaps on the time axis with the uplink grant received in RAR having been transmitted, the terminal may ignore at operation 850 such SR transmission and consider as if the SR transmission has not occurred.

Specifically, in the process of prioritization with other uplink grants, the terminal may exclude such SR transmission that is not performed from priority comparison with the other uplink grants overlapping on the time axis. Hence, even if there is another uplink grant overlapping on the time axis with the SR transmission having been excluded from priority comparison, the other uplink grant can be transmitted. However, the uplink grant received in RAR 810 and the other uplink grant 830 cannot be transmitted simultaneously in the same cell, but can be transmitted simultaneously if they are resources allocated to different cells.

Figure 9:
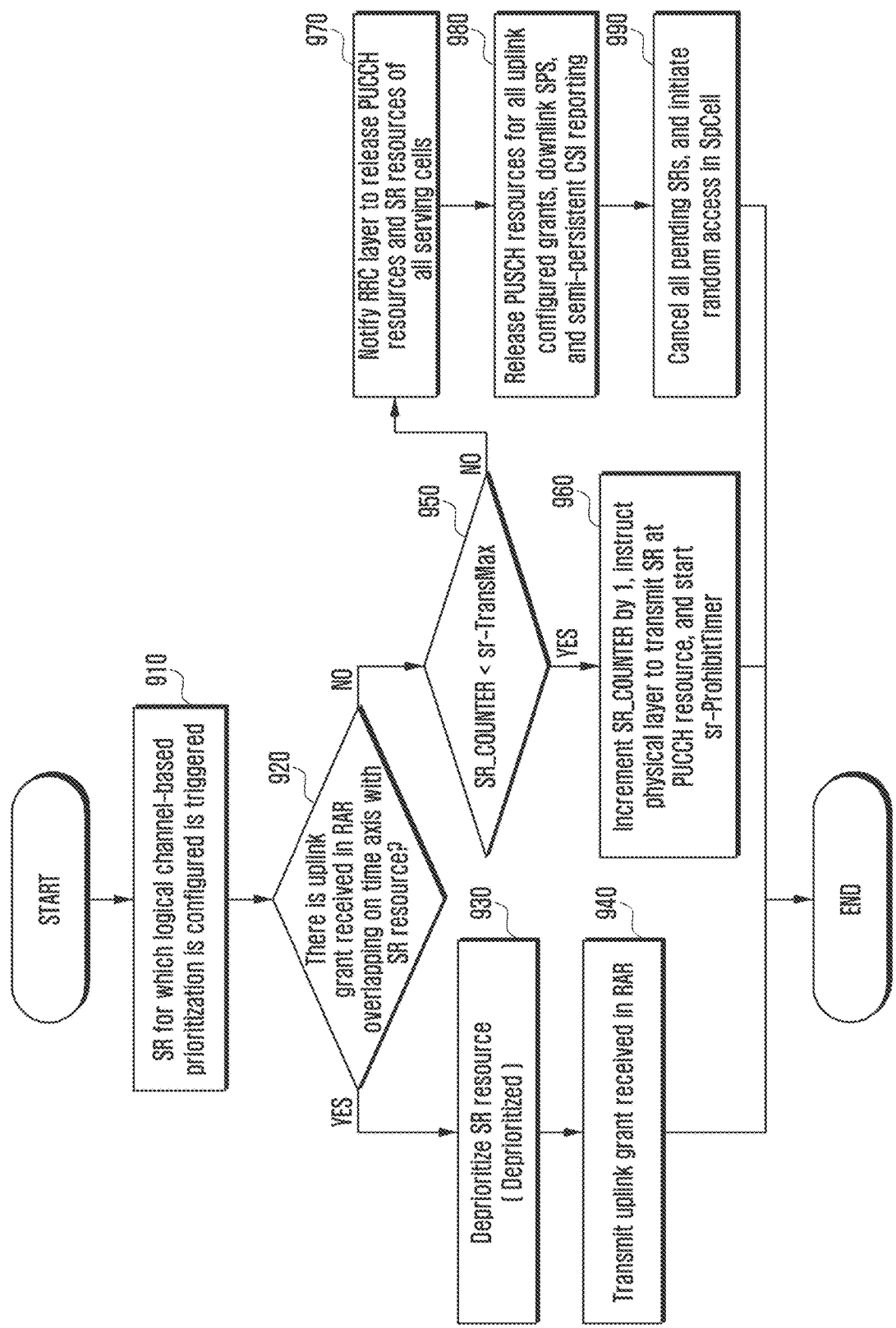
FIG. 9 is a flowchart illustrating a method for a terminal to handle SR transmission that overlaps with an uplink grant received in RAR on a time axis according to an embodiment of the disclosure.

FIG. 9 is a flowchart illustrating a method for a terminal to handle SR transmission that overlaps on a time axis with an uplink grant received in RAR according to an embodiment of the disclosure.

Referring to FIG. 9, if SR transmission transmitted in the uplink overlaps on the time axis with the uplink grant received in RAR, it may be required to use the uplink grant received in RAR according to the possibility of transmitting a MAC PDU present in the message 3 buffer. The embodiment of FIG. 8 shows that the uplink grant received in RAR overlaps with the SR transmission on the time axis.

In the embodiment of FIG. 9, it can be assumed that SR transmission is triggered in a MAC entity in which logical channel-based prioritization is configured based on the highest priority of a logical channel included in or to be included in an uplink grant at operation 910. For example, a terminal may identify that SR transmission is triggered in a MAC entity in which logical channel-based prioritization is configured based on the highest priority of a logical channel included or to be included in an uplink grant. However, this logical channel-based prioritization may be considered as the configuration indicating prioritization operation between uplink grants, and may be applied in the same way even when a separate configuration indicating prioritization of SR transmission and uplink grants is set. For example, logical channel-based prioritization may be applied in the same way even when separate information indicating prioritization of SR transmission and uplink grants is configured in the terminal.

The terminal may check at operation 920 whether the SR transmission and the uplink grant received in RAR overlap on the time axis within the MAC entity. If the SR transmission and the uplink grant received in RAR overlap on the time axis within the MAC entity, the terminal may deprioritize at operation 930 the SR transmission and ignore the SR transmission, and transmit the uplink grant received in RAR at operation 940. As a result, even if the SR transmission that is not actually performed overlaps with another uplink grant on the time axis, it is possible to prevent the occurrence of a problem that the other uplink grant is deprioritized due to the SR transmission that is not actually performed. In addition, the uplink grant received in RAR at operation 920 may include an uplink grant allocated with a temporary C-RNTI.

If the SR transmission and the uplink grant received in RAR does not overlap on the time axis at operation 920, this may mean that the SR transmission can be actually performed. However, only when the value of SR_COUNTER indicating the number of SR transmission attempts is less than a preset threshold sr-TransMax at operation 950, may the terminal increment SR_COUNTER by 1 and the MAC entity may instruct the physical layer to perform SR transmission with the corresponding PUCCH resource. Additionally, the terminal may start sr-ProhibitTimer to prevent repetitive SR transmission at operation 960.

If the value of SR_COUNTER is equal to sr-TransMax, as it is no longer possible to perform SR transmission, the terminal may notify at operation 970 the RRC layer to release PUCCH resources and SR resources of all serving cells. Also, the terminal may release at operation 980 PUSCH resources for all uplink configured grants, downlink semi-persistent scheduling (SPS), and semi-persistent channel status information (CSI) reporting. Then, the UE may cancel at operation 990 all pending SR transmissions and initiate a random access operation in the special cell (SpCell).

Figure 10:
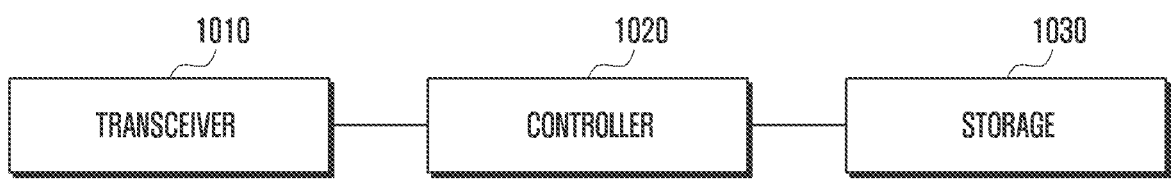
FIG. 10 is a block diagram illustrating a structure of a terminal according to an embodiment of the disclosure.

FIG. 10 is a block diagram illustrating a structure of a terminal according to an embodiment of the disclosure.

Referring to FIG. 10, a terminal may include a transceiver 1010, a controller 1020, and storage 1030. In the disclosure, the controller 1020 may be defined as a circuit, an application-specific integrated circuit, or at least one processor.

The transceiver 1010 may transmit and receive signals to and from another network entity. For example, the transceiver 1010 may receive system information from a base station and may receive a synchronization signal or a reference signal.

The controller 1020 may control the overall operation of the terminal according to embodiments proposed in the disclosure. For example, the controller 1020 may control signal flows between blocks to execute operations according to the above-described flowcharts.

Specifically, the controller 1020 may be configured to identify whether a medium access control (MAC) entity of the terminal is configured with a logical channel (LCH)-based prioritization, identify whether a first uplink grant is associated with a random access, in case that the MAC entity is configured with the LCH-based prioritization, determine to consider the first uplink grant as a prioritized uplink grant, in case that the first uplink grant is associated with the random access, and transmit, via the transceiver 1010, an uplink signal based on the prioritized uplink grant.

The storage 1030 may store at least one of information transmitted and received through the transceiver 1010 or information generated through the controller 1020.

Figure 11:
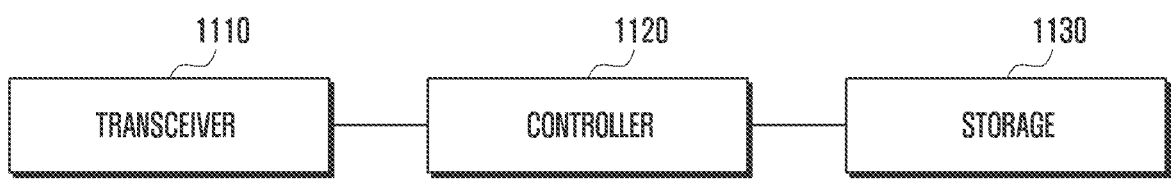
FIG. 11 is a block diagram illustrating a structure of a base station according to an embodiment of the disclosure.

FIG. 11 is a block diagram illustrating a structure of a base station according to an embodiment of the disclosure.

Referring to FIG. 11, a base station may include a transceiver 1110, a controller 1120, and storage 1130. In the disclosure, the controller 1120 may be defined as a circuit, an application-specific integrated circuit, or at least one processor.

The transceiver 1110 may transmit and receive signals to and from another network entity. For example, the transceiver 1110 may transmit system information to a terminal and may transmit a synchronization signal or a reference signal.

The controller 1120 may control the overall operation of the base station according to embodiments proposed in the disclosure. For example, the controller 1120 may control signal flows between blocks to execute operations according to the above-described flowcharts.

Specifically, when a terminal needs to perform random access to the base station, the controller 1120 may control the transceiver 1110 to receive a random access preamble (RA preamble) from the terminal and may control the transceiver 1110 to transmit a random access response (RAR) to the terminal. For example, the RAR message may include a timing advance value to be adjusted by the terminal, allocation information of an uplink grant that can be used by the terminal receiving the RAR to transmit data, and a temporary cell-radio network temporary identifier (C-RNTI) to be used during the random access process.

The storage 1130 may store at least one of information transmitted and received through the transceiver 1110 or information generated through the controller 1120.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a terminal in a wireless communication system, the method comprising:
   identifying that a scheduling request (SR) is triggered;
   based on the SR being triggered and a medium access control (MAC) entity of the terminal being configured with a logical channel (LCH)-based prioritization, identifying whether a resource for an SR transmission associated with the triggered SR overlaps with an uplink grant addressed to a temporary cell-radio network temporary identifier (TC-RNTI);
   in case that the resource for the SR transmission does not overlap with the uplink grant addressed to the TC-RNTI:
      identifying whether a counter for the SR transmission is less than a threshold, and
      in case that the counter for the SR transmission is less than the threshold, transmitting the SR based on the resource for the SR transmission; and
   in case that the resource for the SR transmission overlaps with the uplink grant addressed to the TC-RNTI, considering the SR transmission as a de-prioritized SR transmission.

2. The method of claim 1, further comprising:
   considering the uplink grant addressed to the TC-RNTI as a prioritized uplink grant; and
   transmitting an uplink signal based on the prioritized uplink grant.

3. The method of claim 1, wherein the counter for the SR transmission is incremented by 1, in case that the counter for the SR transmission is less than the threshold.

4. The method of claim 1, further comprising:
   identifying whether a configured uplink grant overlaps with the uplink grant addressed to the TC-RNTI.

5. The method of claim 4, further comprising:
   setting a hybrid automatic repeat request (HARQ) process identifier (ID) to an HARQ process ID associated with a physical uplink shared channel (PUSCH) for the configured uplink grant, in case that the configured uplink grant does not overlap with the uplink grant addressed to the TC-RNTI;
   determining a new data indicator (NDI) to have been toggled; and
   delivering, to an HARQ entity of the terminal from the MAC entity, the configured uplink grant and HARQ information associated with the configured uplink grant.

6. The method of claim 4, wherein the configured uplink grant is ignored, in case that the configured uplink grant overlaps with the uplink grant addressed to the TC-RNTI.

7. A terminal in a wireless communication system, the terminal comprising:
   a transceiver; and
   at least one processor coupled with the transceiver and configured to:
      identify that a scheduling request (SR) is triggered,
      based on the SR being triggered and a medium access control (MAC) entity of the terminal being configured with a logical channel (LCH)-based prioritization, identify whether a resource for an SR transmission associated with the triggered SR overlaps with an uplink grant addressed to a temporary cell-radio network temporary identifier (TC-RNTI),
      in case that the resource for the SR transmission does not overlap with the uplink grant addressed to the TC-RNTI:
         identify whether a counter for the SR transmission is less than a threshold, and
         in case that the counter for the SR transmission is less than the threshold, transmit, via the transceiver, the SR based on the resource for the SR transmission, and
      in case that the resource for the SR transmission overlaps with the uplink grant addressed to the TC-RNTI, consider the SR transmission as a de-prioritized SR transmission.

8. The terminal of claim 7, wherein the at least one processor is further configured to:

consider the uplink grant addressed to the TC-RNTI as a prioritized uplink grant, and transmit, via the transceiver, an uplink signal based on the prioritized uplink grant.

9. The terminal of claim 7, wherein the counter for the SR transmission is incremented by 1, in case that the counter for the SR transmission is less than the threshold.

10. The terminal of claim 7, wherein the at least one processor is further configured to:

identify whether a configured uplink grant overlaps with the uplink grant addressed to the TC-RNTI.

11. The terminal of claim 10, wherein the at least one processor is further configured to:

set a hybrid automatic repeat request (HARQ) process identifier (ID) to an HARQ process ID associated with a physical uplink shared channel (PUSCH) for the configured uplink grant, in case that the configured uplink grant does not overlap with the uplink grant addressed to the TC-RNTI, determine a new data indicator (NDI) to have been toggled, and deliver, to an HARQ entity of the terminal from the MAC entity, the configured uplink grant and HARQ information associated with the configured uplink grant.

12. The terminal of claim 10, wherein the configured uplink grant is ignored, in case that the configured uplink grant overlaps with the uplink grant addressed to the TC-RNTI.

* * * * *